United States Patent [19]

Shimizu et al.

[11] Patent Number: 4,840,998
[45] Date of Patent: Jun. 20, 1989

[54] MODIFIED POLYTETRAFLUOROETHYLENE FINE POWDER AND PRODUCTION OF THE SAME

[75] Inventors: Tetsuo Shimizu, Ibaraki; Kazutaka Hosokawa, Settsu, both of Japan

[73] Assignee: Daikin Industries Ltd., Osaka, Japan

[21] Appl. No.: 89,766

[22] Filed: Aug. 27, 1987

[30] Foreign Application Priority Data

Aug. 27, 1986 [JP] Japan .................. 61-200506

[51] Int. Cl.$^4$ .................................. C08F 259/08
[52] U.S. Cl. .................... 525/276; 525/902
[58] Field of Search ................ 525/276, 902

[56] References Cited

U.S. PATENT DOCUMENTS

| | | | |
|---|---|---|---|
| 4,036,802 | 7/1977 | Poirier | 525/276 |
| 4,038,231 | 7/1977 | Downer et al. | 525/276 |
| 4,058,578 | 11/1977 | Kuhls et al. | 525/276 |
| 4,129,618 | 12/1978 | Downer et al. | 525/276 |
| 4,134,995 | 1/1979 | Fumoto et al. | 525/276 |
| 4,368,296 | 1/1983 | Kuhls et al. | 525/276 |
| 4,391,940 | 7/1983 | Kuhls et al. | 525/276 |

FOREIGN PATENT DOCUMENTS 0030664 6/1981 European Pat. Off. .

*Primary Examiner*—Carman J. Seccuro
*Attorney, Agent, or Firm*—Birch, Stewart, Kolasch & Birch

[57] ABSTRACT

Modified PTFE fine powder which comprises primary particles having an average particle size of 0.1 to 0.6 μm and contains 0.01 to 0.15% by weight, based on the total weight of the particles, of at least one olefinically unsaturated compound selected from the group consisting of a fluoroalkyl vinyl ether of the formula:

$$X(CF_2)_nOCF=CF_2 \qquad (I)$$

wherein X is a hydrogen atom, a fluorine atom or a chlorine atom and n is an integer of 1 to 6, and a fluoroalkyl vinyl ether of the formula:

$$C_3F_7(OCF_2CF_2CF_2)_m[OCF(CF_3)CF_2]_lOCF=CF_2 \qquad (II)$$

wherein m is an integer of 0 to 2 and l is an integer of 0 to 2 mainly in core parts of the particles and 0.04 to 0.25% by weight, based on the total weight of the particles, of chlorotrifluoroethylene in shell parts, which has good paste extrudability and heat stability.

9 Claims, No Drawings

MODIFIED POLYTETRAFLUOROETHYLENE FINE POWDER AND PRODUCTION OF THE SAME

BACKGROUND OF THE INVENTION

1. Field of the Invention

The present invention relates to modified polytetrafluoroethylene (hereinafter referred to as "PTFE") fine powder and production of the same. More particularly, it relates to PTFE fine powder having good paste extrudability and thermal stability and a process for producing such modified PTFE fine powder.

2. Description of the Prior Arts

PTFE can be modified while maintaining its inherent non-melt moldability by copolymerizing tetrafluoroethylene (hereinafter referred to as "TFE") with at least one other fluorine-containing monomer in an amount of not larger than about 2% by weight. Such a copolymer is known as a "modified PTFE" and is distinguished from a melt moldable TFE copolymer. In the present specification, the term "modified PTFE" is used to define PTFE modified with a small amount of a comonomer as described above, although PTFE which is prepared by controlling its molecular weight with a molecular weight modifier such as methane and ethanol, it may still be referred to as "modified PTFE" in a broad sense. Modified PTFE often has physical properties and/or moldability which are not found in "pure" PTFE. The comonomer used for modifying PTFE includes $CF_3$—$CF=CF_2$, $C_3F_7OCF=CF_2$, $ClCF=CF_2$, $C_4F_9CH=CH_2$, and mixtures therof.

The PTFE and modified PTFE are classified roughly into two types. One is a granular resin which is prepared by finely grounding particulate PTFE resin obtained by suspension polymerization and the other is fine powder which is prepared by coagulating the resin from a latex obtained by an aqueous dispersion polymerization (emulsion polymerization) and drying the coagulated resin. The granular resin and the fine powder of PTFE or modified PTFE are practically produced and used, but they are molded in different molding manners. The granular resin is molded by press molding and ram extrusion, and the fine powder is molded by paste extrusion and calendering in which a lubricant is mixed with the fine powder.

Generally, the suspension polymerization is described, for example, in Japanese Patent Publication Nos. 25398/1976 and 31524/1984, and the aqueous dispersion polymerization is described in U.S. Pat. No. 2,965,595. Both polymerization methods are carried out in deionized deoxygenated water contained in a polymerization reactor equipped with a temperature controller and a stirrer by adding various additives in the water, replacing the interior of a reactor several times with nitrogen gas, adding TFE under pressure and then charging the modifier comonomer and an initiator to copolymerize TFE and the modifier.

As the additives, there are exemplified a buffer, a molecular weight modifier, an initiating aid, a non-tackifier, a fluorine-containing dispersant (surfactant) and the like. The main difference between the suspension polymerization and the aqueous dispersion polymerization resides in that the former uses no or little dispersant while the latter uses the dispersant in a sufficient amount for stably dispersing latex particles in an aqueous medium, for example, in an amount of about 100 to 10,000 ppm.

The present invention generally relates to the find powder type modified PTFE resin. As described above, this type of modified PTFE resin is used mainly in paste extrusion in which the resin is mixed with a liquid lubricant and extruded to form a comparatively thin rod or tube. The extrudate is rolled to form a film and used as a so-called raw tape or sintered in the case of a tube or a wire coating.

From an industrial view point, it is required for the PTFE fine powder to be paste extruded with efficiency under high productivity, and a sintered extrudate should have large strength. To achieve high productivity, a reduction ratio (RR) during extrusion is important. The reduction ratio is a ratio of a cross section (S) of a cylinder filled with the fined powder to be extruded to a cross section (s) of an outlet of an extruder die (S/s). The larger reduction ratio is preferred to charge a larger amount of the PTFE fine powder in the cylinder and extrude it in one extrusion cycle. The reduction ratio is measured and compared by extruding the PTFE fine powder under the same extrusion condition such as an extrusion ratio. The possible upper limit of the reduction ratio varies with the type of PTFE fine powder. When the reduction ratio exceeds the upper limit attributed to a specific PTFE fine powder, any normal extrudate cannot be produced. For example, the extrudate is extruded in a zig zag line or in a spiral form, a surface or an inner part of the extrudate is cracked by shear force, or the extrudate is broken during extrusion. To improve the paste extrudability under high reduction ratio (hereinafter referred to as "HRR extrudability"), many techniques have been proposed.

One of the most early proposals is a TFE polymerization method disclosed in U.S. Pat. No. 3,142,665 and its corresponding Japanese Patent Publication No. 4643/1962. This TFE polymerization method is characterized in that the modifier is introduced to a polymerization system before 70% of TFE is consumed and polymerized. As the modifier, not only copolymerizable monomers are exemplified but also methanol and the like. The introduction of the modifier to PTFE reduces the crystallinity of the polymer and the suppresses and inherent fibrillation property of the PTFE. As the reduction ratio increases, the extrusion pressure rises. However, the extrusion at high pressure applies large shear force on the primary particles and tends to enhance fibrillation of the particles, which results in an abnormal flow of the resin during extrusion and formation of defects or cracks in the extrudate or the sintered article. Therefore, the suppression of the fibrillation property of PTFE by the introduction of the modifier reduces extrusion defect under HRR due to excess fibrillation of the resin.

The method described in Example 24 of U.S. Pat. No. 3,142,665 comprised adding the modifier to the polymerization system when 60% of TFE to be polymerized was consumed. However, in other Examples of said U.S. Patent, the modifier was introduced from very beginning of the polymerization. Japanese Patent Publication No. 26242/1981 describes the polymerization of TFE using the modifier. In this polymerization, chlorotrifluoroethylene (hereinafter referred to as "CTFE") was introduced when 70 to 85% of the polymerization completed so as to modify a shell part of each resin particle near the particle surface, whereby modified PTFE fine powder which has low extrusion pressure and good HRR extrudability can be obtained.

In addition, it was proposed to improve HRR extrudability of the PTFE fine powder by modifying a core part of each resin particle more than a shell part (cf. Japanese Patent Publication No. 50814/1982).

Further, it was proposed to form a three layered PTFE resin particle in which the first and third layers were modified while the second layer was not (cf. Japanese Patent Publication No. 92943/1981).

The introduction of the modifier to the PTFE fine powder may improve some properties of the sintered final product rather than the paste extrudability of the PTFE fine powder. Sometimes, the modifier is used to this end. Particularly when the copolymerizable modifier is used, transparency of the sintered article of PTFE is improved, and sintering time can be shortened. For example, U.S. Pat. No. 3,819,594 describes that when perfluroalkyl vinyl ether is used as a modifier and a persulfate is used as the polymerization initiator, modified PTFE obtained has significantly improved mechanical properties, particularly flexural fatigue strength.

The PTFE fine powder for HRR extrusion is processed in the form of a wire coating or a thin tube and increasingly used in a field wherein better properties are required, for example, in air plane, automobile and precision machine industries. The modified PTFE fine powder, however, may have less thermal stability than the pure PTFE fine powder, particularly when a certain type of the modifier is used. For some types of such modified PTFE fine powder, it is desired to improve thermal stability without deteriorating the HRR extrudability. Although the CTFE-modified PTFE fine powder (cf. Japanese Patent Publication No. 26242/1981) has superior HRR extrudability to other modified PTFE fine powder, it tends to have a larger thermal instability index (TII) as defined by ASTM D-1457 81a. The TII is an index calculated from difference of densities of the articles which are sintered for various periods of time. The smaller TII is preferred, although the large TII does not necessarily mean easy heat deterioration of the PTFE fine powder, or the stress crack found in the wire coating may be caused by the extrusion technique in many cases. For example, measurement of the TII of commercially available PTFE fine powder revealed that the TII of the CTFE-modified PTFE fine powder is mostly in a range between 30 and 50. On the contrary, unmodified PTFE having 2.22 or less of a standard specific gravity (SSG) as defined below and in turn a sufficiently large molecular weight has the TII of not larger than 30. Although PTFE modified with perfluoroalkyl vinyl ether as disclosed in U.S. Pat. No. 3,819,594 has a TII of nearly zero and is satisfactory, it has insufficient HRR extrudability.

SUMMARY OF THE INVENTION

One object of the present invention is to provide modified PTFE fine powder having a small TII while maintaining an excellent HRR extrudability due to the modification with CTFE.

Another object of the present invention is to provide modified PTFE fine powder having good moldability, from which a sintered article having good transparency or clarity can be produced.

These and other object are achieved by modified PTFE fine powder of the present invention, which comprises primary particles having an average particle size of 0.1 to 0.6 μm and contains 0.01 to 0.15% by weight, based on the whole weight of the particles, of a least one olefinically unsaturated compound selected from the group consisting of a fluoroalkyl vinyl ether of the formula:

$$X(CF_2)_nOCF=CF_2 \qquad (I)$$

wherein X is a hydrogen atom a fluorine atom or a chlorine atom and n is an integer of 1 to 6, and a fluoroalkyl vinyl ether of the formula:

$$C_3F_7(OCF_2CF_2CF_2)_m[OCF(CF_3)CF_2]_lOCF=CF_2 \qquad (II)$$

wherein m is an integer of 0 to 2 and l is an integer of 0 to 2 mainly in core parts of the particles and 0.04 to 0.25% by weight, based on the whole weight of the particles, of chlorotrifluoroethylene in shell parts.

DETAILED DESCRIPTION OF THE INVENTION

Preferably, the content of the fluoroalkyl vinyl ether is from 0.02 to 0.04% by weight based on the whole weight of the PTFE particles. The content of CTFE is preferably from 0.06 to 0.20% by weight, more preferably from 0.06 to 0.15% by weight based on the whole weight of the PTFE particles.

According to the present invention, a weight ratio of the core part and the shell part of the particle is from 50:50 to 98:2, preferably from 70:30 to 95:5.

The modified PTFE fine powder of the present invention contains more modified in the shell part than in the core part in a similar manner as in the PTFE fine powder disclosed in Japanese Patent Publication No. 26242/1981.

Although the core-shell structure of the PTFE fine powder is known, the particle structure of the present invention is novel.

When the content of the fluoroalkyl vinyl ether in the core part is larger than the above upper limit, the melt viscosity of the modified PTFE becomes so low that it readily flows, for example when a thin tube extruded from such a modified PTFE is sintered, the dimensional stability of the article is deteriorated. When the content of CTFE in the shell part is larger than 0.25% by weight, the TII of the modified PTFE fine powder exceeds 30. When the content of CTFE is less than 0.04% by weight, the modified PTFE fine powder has insufficient HRR extrudability. If the core part is modified with the CTFE and the shell part is modified with the fluoroalkyl vinyl ether, the modified PTFE fine powder does not have satisfactory HRR extrudability and has a larger TII than the modified PTFE fine powder of the present invention.

In case where other modifiers such as hexafluoropropene is used in the core part and CTFE is used in the shell part, the produced modified PTFE fine powder has good HRR extrudability but unsatisfactory TII.

As to the weight ratio of the core part and the shell part, when the ratio of the core part is too small, the paste extrusion pressure becomes high so that the HRR extrudability is deteriorated. On the contrary, when the ratio of the core part is too large, namely the ratio of the shell part is too small, the extrusion pressure of the modified PTFE fine powder tends to become too high, contrary to expectation and, in addition, it is difficult to control the reaction conditions in the polymerization step.

The modifiers are not necessarily homogeneously dispersed in the core and shell parts of the modified PTFE particle. During the formation of the shell part, the concentration of the CTFE in the charged monomer mixture may fluctuate and in turn the composition in the shell part may vary insofar as the concentration of the CTFE in the monomer mixture is not less than 0.01% by mole at any instance of the polymerization. When the concentration of CTFE is less than 0.01% by mole, substantially unmodified PTFE is formed so that the extrudability of the PTFE fine powder is not improved. The distribution of the fluoroalkyl vinyl ether in the core part can vary with the charging manner of the modifier. Preferably, at least a part of the modifier to be charged is present in the polymerization system from the beginning of the polymerization. Since the fluoroalkyl vinyl ether in which the alkyl group is a lower alkyl group such as trifluoromethyl trifluorovinyl ether has high copolymerization reactivity, when the total amount of such an ether is charged in the polymerization system from the beginning of the polymerization, the center part of the particle tends to contain the modifier in a large content.

In a preferred embodiment, the primary particle has such structure that the core part contains the fluoroalkyl vinyl ether in an amount of 0.02 to 0.03% by weight based on the total weight of the particle, the shell part contains CTFE in an amount of 0.06 to 0.15% by weight based on the total weight of the particle and the weight ratio of the core part and the shell part is from 70:30 to 95:5. In this case, the modified PTFE fine powder has a TII of less than 20.

Other factors such as types and amounts of the modifiers and their combination can influence the TII of the modified PTFE fine powder. Generally, the TII and the SSG of PTFE have some relationship and SSG should be less than a certain value to keep the TII at a suitable value. Since the SSG is inverse proportional to the molecular weight of the PTFE, the molecular weight should be more than a certain value to reduce the TII. In case of the modified PTFE fine powder, the SSG is usually from 2.150 to 2.20, preferably from 2.175 to 2.185. The SSG of the PTFE can be controlled by adjusting the amount of the polymerization initiator to be used during polymerization. Generally, when the amount of the initiator is small, the SSG of PTFE is small, and when the amount of the initiator is large, the SSG of PTFE is large.

The modified PTFE fine powder of the present invention can be prepared according to the conventioanl aqueous dispersion polymerization as described above. Namely, the polymerization is carried out in an aqueous medium containing the fluorine-containing dispersant by using the polymerization initiator. As the polymerization initiator, a persulfate (e.g. ammonium persulfate, potassium persulfate, etc.), a water-soluble organic peroxide (e.g. disuccinic acid peroxide, diglutaric acid peroxide, etc.) or a mixture thereof can be used. In case of the persulfate initiator, an amount to be used is from 1 to 1,000 ppm, preferably from 2 to 200 ppm based on the amount of the aqueous medium. In case of disuccinic acid peroxide, it is used in an amount of 1 to 5,000 ppm, preferably 20 to 1,000 ppm based on the amount of the aqueous medium. When the polymerization is carried out at a lower temperature (for example, 10° to 40° C.), in addition to the above peroxide, a reducing agent such as sodium sulfite and sodium hydrogensufite is used to form a redox system. When a mixture of disuccinic acid peroxide and the persulfate in a weight ratio of 50:1 to 8:1 is used, the paste extrudability of the modified PTFE fine powder can be improved. In this case, although both initiators can be charged simultaneously into the polymerization system, they can be charged at different time as disclosed in Japanese Patent Kokai Publication No. 28088/1973.

The fluorine-containing dispersant includes compounds of the formulas:

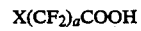
$$X(CF_2)_aCOOH$$

wherein X is the same as defined in the above and a is an integer of 6 to 12,

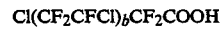
$$Cl(CF_2CFCl)_bCF_2COOH$$

wherein b is an integer of 2 to 6,

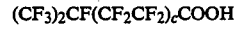
$$(CF_3)_2CF(CF_2CF_2)_cCOOH$$

wherein c is an integer of 2 to 6,
$$F(CF_2)_dO(CFYCF_2O)_eCFYCOOH$$

wherein Y is a fluorine atom or a trifluoromethyl group, d is an integer of 1 to 5 and e is an integer of 0 to 10, or their salts such as ammonium salts and potassium salts, etc. The amount of the dispersant to be added is from 0.01 to 1% by weight, preferably from 0.02 to 0.5% by weight based on the weight of the aqueous medium.

To the aqueous medium, there can be added a dispersion stabilizer which is substantially inactive to the reaction such as a hydrocarbon having at least 12 carbon atoms which is in a liquid state under the reaction conditions. Further, to adjust pH of the reaction medium, a buffer such as ammonium carbonate and ammonium phosphate may be added.

The polymerization temperature is selected from a wide range between 10° and 100° C. When the persulfate and the water soluble organic peroxide are used alone or as a mixture, the polymerization temperature is preferably from 50° to 90° C. In the case of a redox polymerization utilizing a combination of the persulfate and sodium sulfite or of disuccinic acid peroxide and reduced iron, the polymerization temperature may be lower, for example, 10° to 40° C.

Usually, the polymerization is carried out by keeping the pressure in a range between 6 to 30 kg/cm$^2$ by the pressure generated by TFE itself. Normally, the reaction pressure is kept constant, although it may be changed by changing the TFE pressure so as to control the particle size of the produced polymer (cf. Japanese Patent Kokai Publication No. 76516/1985).

The fluoroalkyl vinyl ether which is used as the modifier according to the present invention is most preferably added in one portion to the polymerization system when the polymerization is initiated. CTFE is added to the polymerization system after sufficient amount of TFE for forming the core part is consumed. Alternatively, the monomer mixture of TFE and CTFE is charged in place of pure TFE which has been supplied in the core part forming step. When CTFE or the mixture of CTFE and TFE is charged in the polymerization system, a small amount of the fluoroalkyl vinyl ether may still be present in the polymerization system since it has poor reactivity with TFE. In such a case, TFE containing the fluoroalkyl vinyl ether is purged from the polymerization system before the subsequent polymerization is carried out to form the shell part which contains no fluoroalkyl vinyl ether. However, since the amount of the fluoroalkyl vinyl ehter to be used is smaller than that of CTFE and most of the fluroalkyl vinyl ether has been consumed in the core part forming step, even when the second step polymerization is carried out without purging TFE containing the fluoroalkyl vinyl ether, almost all of the modifier in the shell part consists of CTFE. Accordingly, the modified PTFE fine powder prepared by one step polymerization may contain a very small amount of the fluoroalkyl vinyl ether in the shell part. However, such modified PTFE fine powder is also in the scope of the present invention.

The reason why the primary particles of the modified PTFE fine powder has the above described core-shell structure by the above polymerization procedure may be as follow:

First, in the aqueous dispersion polymerization of TFE, the number of the polymer particles is substantially determined in an initial stage for forming the particle nuclei, namely in a stage in which the polymer concentration in the aqueous dispersion is less than 10% by weight and thereafter the number of the polymer particles does not change, and the subsequent polymerization takes place on the surfaces of the already formed polymer particles, so that the diameter of the particle increases. Therefore, each of the polymer particles has a core-shell structure having monomer compositions corresponding to the monomer compositions in the polymerization system.

Second, even in the polymerization stage in which the number of the polymer particles does not change, new particles may be generated by the addition of a certain type of the modifier. However, CTFE has little tendency to generate new particles. Thus, when the core part and the shell part are referred in the present specification, the former is a part formed before the charge of the substantial part of CTFE, and the latter is formed thereafter.

The polymerization is terminated when the concentration of the polymer reaches 20 to 45% by weight by purging the monomer from the polymerization system and stopping the stirring.

Thereafter, the aqueous dispersion of modified PTFE (hereinafter referred to as "polymer latex" or "latex") is removed from the reactor or autoclave followed by coagulation and drying. The coagulation of the modified PTFE fine powder is usually carried out by diluting the latex with water to a polymer concentration of 10 to 20% by weight and optionally adjusting pH to a neutral or alkaline range and then vigorously agitating the diluted latex in a container equipped with an agitator. In coagulation, any of a conventionally used coagulating agent may be added to the latex. Examples of the coagulating agentare water-soluble organic compounds (e.g. methanol and acetone), inorganic salts (e.g. potassium nitrate and ammonium carbonate), inorganic acids (e.g. hydrochloric acid, sulfuric acid, and nitric acid) and the like. Before or during coagulation, a pigment for coloring and/or various fillers for improving the mechanical properties may be added so as to prepare the modified PTFE fine powder homogeneously filled with such additives. By adequate stirring during coagulation, subsequent to the isolation of PTFE from the latex, granulation and grading can be simultaneously carried out. Thereby, the handling property of the fine powder after coagulation is improved.

Drying of the coagulated PTFE fine powder is carried out by means of vacuum, high frequency or heated air under such condition that the wet powder is not excessively fluidized, and preferably is kept standing. Contact or friction between the particles particularly at a high temperature adversely influences the PTFE fine powder, since the PTFE fine powder is easily fibrilled by small shear force to lose its stable particulate structure. The drying temperature is usually from 10° to 250° C., preferably from 100° to 180° C. The drying temperature has great influence on the past extrudability of the modified PTFE fine powder such that the past extrusion pressure should be high when the drying temperature of the PTFE fine powder is too high. Thus, in order to compare the paste extrudability of various types of PTFE fine powder, it is necessary to dry them at the same temperature.

PREFERRED EMBODIMENTS OF THE INVENTION

The present invention will be illustrated by following examples, in which analyses of the polymer latex and the PTFE fine powder and measurements of the properties are carried out as follows:

Polymer concentration

10 Grams of the polymer latex is placed on a glass dish and kept standing in a drying furnance at 150° C. for about 3 hours to evaporate to dryness. A residual solid is weighed, and a polymer concentration is calculated.

Average particle size of primary particles

An average particle size of the primary particles is determined by comparing a transmittance of light having a wavelength of 550 nm through a unit length of the polymer latex diluted to a solid content of about 0.22% by weight by water with a calibration curve (or line) prepared from such transmittance and an average particle size measured from an electron microscope photograph of the sample latex.

Standard specific gravity (SSG)

The SSG of the PTFE fine powder is defined as a ratio of the weight in air of a polymer sample prepared according to ASTM D-1457 81A to the weight of water (at 23° C.) of the same volume as the polymer sample. The polymer sample is prepared by charging 12 g of the dried polymer powder is placed between a pair of aluminum sheets in a cylindrical mold having a diameter of 1.86 cm, gradually increasing pressure over about 30 minutes till final pressure of about 140.7 kg/cm$^2$ and then keeping the same pressure for 2 minutes. The premolded polymer sample is placed in an oven kept at 290° C., heated from 290° C. to 380° C. at a heating rate of 2° C./min., kept at 380° C. for 30 minutes, cooled to 294° C. at a cooling rate of 1° C./min. and removed from the oven followed by kept standing at 23° C. for 3 hours.

The SSG is a type of indirect measure for expressing the molecular weight of a TFE polymer. The smaller the SSG, the larger the molecular weight.

TII

The TII is measured according to ASTM D-1457 81A.

HRR extrudability (Paste extrusion pressure)

The PTFE fine powder (50 g) and an extrusion aid (a hydrocarbon oil, trade name "IP 1620" manufactured by Iedmitsu Petrochemical) (10.8 g) are mixed in a glass bottle and aged at a room temperature (25°±2° C.) for one hour. Then, the mixture is charged in an extrusion die having a cylinder of 25.4 mm in inner diameter and kept standing with applying a load of 60 kg to a piston for one minute. The dimensions of the extrusion die vary with the RR as shown in Table 1.

TABLE 1

| | Extrusion die dimensions | | |
|---|---|---|---|
| | Draw angle of die (degree) | Orifice diameter (mm) | Orifice length (mm) |
| RR1500 | 30 | 0.65 | 2.0 |
| RR2000 | 30 | 0.57 | 1.7 |

Then, the mixture is extruded at a ram speed (a pressing down speed of the piston) of 20 mm/min. to form a strand form extrudate. The paste extrusion pressure ($kg/cm^2$) is calculated by dividing the extrusion pressure which is measured when the pressure is equilibrated in the later period of extrusion by a cross section of the cylinder.

(Appearance of the extrudate)

The appearance of the extrudate obtained in the above paste extrusion is visually inspected and ranked according to the following criteria:

A: A continuous extrudate is obtained with no zig zag line.

B: A continuous extrudate is obtained with a slight zig zag line.

C: A continuous extrudate is obtained with a considerable zig zag line.

D: No continuous extrudate is obtained.

EXAMPLE 1

In an 6 liter stainless steel (SUS 316) autoclave equipped with an anchor agitator and a temperature controlling jacket, deionized water (296 ml), a solid paraffin wax having a melting point of 56° C. (100 g) and ammonium perfluorooctanoate (3.0 g) are charged. The interior of the autoclave is replaced with nitrogen gas (three times) and TFE gas (twice) to remove oxygen and pressurized with TFE to 7.0 $kg/cm^2G$. Then, the content is stirred at 280 rpm with maintaining the inner temperature at 70° C.

Perfluoropropyl vinyl ether (hereinafter referred to as "PPVE") (0.3 g) is charged, and then a solution of ammonium persulfate (hereinafter referred to as "APS") (11.25 g) in water (20 ml) and an aqueous solution (20 ml) containing disuccinic acid peroxide (360 mg) are injected with TFE to pressurize the interior pressure to 8.0 $kg/cm^2G$. The reaction proceeded wtih acceleration, but the reaction temperature and a stirring rate are kept at 70° C. and 280 rpm, respectively. TFE is continuously injected to keep the interior pressure at 8.0 $kg/cm^2G$.

When 1,300 g of TFE is consumed after the addition of the initiators, the injection of TFE and stirring are stopped. Immediately, the gas in the autoclave is purged and then a mixture of TFE and 1.5% by mole of CTFE is continuously injected in the autoclave with stirring at 280 rpm to keep the interior pressure at 8.0 $kg/cm^2G$ to continue the reaction. When the consumption of the monomer mixture reached 130 g, the injection of the monomer mixture and stirring are stopped. Immediately, the gas in the autoclave is purged and the reaction mixture is removed from the autoclave to cease the reaction.

During the reaction of the mixed monomers, namely during the formation of the shell parts of the polymer particles, the composition of the monomer mixture is analyzed by gas chromatography to find that the content of CTFE is 0.9 to 1.1% by mole. The weight ratio of the core part and the shell part of the particles obtained by the above reactions is 1,300:130 (about 91:9), which is calculated from the consumed TFE amount and the consumed mixed monomer amount.

A part of the finally obtained latex is evaporated to dryness and the polymer concentration is calculated to be 32.3% by weight. The whole polymer yield calculated from this polymer concentration substantially corresponded to the total amount of the consumed monomers.

The average particle size of the latex particle was 0.20 μm.

The obtained latex is diluted with water to about 15% by weight and stirred in a coagulating vessel with adding ammonium carbonate to coagulate the polymer, which is subsequently dried at about 140° C. for 15 hours.

From the dried modified PTFE fine powder, the contents of PPVE and CTFE are analyzed to be 0.02% by weight and 0.090% by weight, respectively. The SSG and TII of the polymer are 2.176 and 5, respectively.

With respect to the HRR extrudability, the polymer has satisfactory extrusion pressure and the extrudate has good appearance and properties.

The content of CTFE in the polymer is calculated from the absorbances at 957 $cm^{-1}$ and 2,360 $cm^{-1}$ in IR spectrum of the polymer according to the following equation:

$$\text{Content (CTFE)} = \frac{\text{Absorbance at 957 } cm^{-1}}{\text{Absorbance at 2,360 } cm^{-1}} \times 0.58 \text{ (wt \%)}$$

The content of PPVE in the polymer is caculated from the absorbances at 995 $cm^{-1}$ and 2,360 $cm^{-1}$ in IR spectrum of the polymer according to the following equation:

$$\text{Content (PPVE)} = \frac{\text{Absorbance at 995 } cm^{-1}}{\text{Absorbance at 2,360 } cm^{-1}} \times 0.95 \text{ (wt \%)}$$

EXAMPLES 2-14

In the same manner as in Example 1 but changing the reaction conditions such as the amount of DSP and APS, the reaction temperature, the kind and amount of the modifier for the core part, the ratio of the weights of the core and shell parts and the charge manner of CTFE as shown in Table 2, the reaction is carried out to obtain modified PTFE fine powder.

In Example 3, CTFE in the liquid state is injected by the pressure of TFE in the autoclave immediately after the formation of the core part is finished, namely 1,300 g of TFE is consumed without purging the gas in the autoclave. When additional 73 g of TFE is consumed, 0.4 g of CTFE is injected by the pressure of TFE till 1,430 g of TFE is consumed in total. Therefore, the core-shell ratio in Example 3 is expressed by the ratio of the weight of TFE consumed in the formation of the core part to the weight of TFE consumed in the formation of the shell part. In Example 7 and 8, the core-shell ratio is expressed in the same way as in Example 3. In Example 8, CTFE is charged in the autoclave in the same manenr as in Example 3. In other Examlpes, CTFE is added in substantially the same manner as in Example 1.

In Example 11, $CF_2=CFOCF_2CF(CF_3)OCF_2CF_2CF_3$ (hereinafter referred to as "FVE") is used in place of PPVE. The content of FVE in the polymer is calculated from the absorbance at 990 $cm^{-1}$ by using a calibration curve.

The physical properties and moldability of the obtained modified PTFE fine powder are shown in Table 3.

The modified PTFE fine powder obtained in Example 4 having a larger core ratio and a small CTFE content, that obtained in Example 6 having a smaller core ratio, that obtained in Example 11 having a small FVE content or that obtained in Example 14 in which APS alone is used as the initiator has slightly poor moldability at RR=2,000. The modified PTFE fine powder obtained in Example 8 having a slightly large CTFE content has fairly large TII.

TABLE 2

| Example No. | DSP (ppm) | APS (ppm) | Reaction temp. (°C.) | Modifier for core (g) | CTFE charging manner | TFE consumption till CTFE charge (g) | Consumption of mixed monomer (g) | Core-shell weight ratio | CTFE in gas phase (mol %) | Polymer conc. after reaction (wt %) |
|---|---|---|---|---|---|---|---|---|---|---|
| 1 | 120 | 3.75 | 70 | PPVE (0.3) | (*1) | 1,300 | 130 | 91/9 | 0.9–1.1 | 32.2 |
| 2 | 60 | 4.1 | 85 | PPVE (0.3) | (*1) | 1,300 | 130 | 91/9 | 0.8–1.0 | 31.6 |
| 3 | 120 | 3.75 | 70 | PPVE (0.3) | (*2) | 1,300 | 130 (*9) | 91/9 | 2.4–0.42 | 31.5 |
| 4 | 120 | 3.75 | 70 | PPVE (0.3) | (*1) | 1,360 | 72 | 95/5 | 0.8–0.9 | 32.0 |
| 5 | 120 | 3.75 | 70 | PPVE (0.3) | (*3) | 1,000 | 430 | 70/30 | 0.4–0.5 | 32.1 |
| 6 | 120 | 3.75 | 70 | PPVE (0.3) | (*4) | 715 | 715 | 50/50 | 0.2–0.3 | 32.3 |
| 7 | 60 | 4.1 | 85 | PPVE (0.3) | (*5) | 1,300 | 98 (*9) | 93/7 | 1.7–0.4 | 31.4 |
| 8 | 60 | 4.1 | 85 | PPVE (0.5) | (*6) | 1,300 | 130 (*9) | 91/9 | 3.4–1.5 | 32.2 |
| 9 | 60 | 4.1 | 85 | PPVE (0.4) | (*7) | 1,310 | 114 | 92/8 | 1.6–1.7 | 32.0 |
| 10 | 60 | 4.1 | 85 | PPVE (0.8) | (*1) | 1,280 | 127 | 91/9 | 0.8–1.1 | 30.9 |
| 11 | 120 | 3.75 | 70 | FVE (0.5) | (*1) | 1,300 | 130 | 91/9 | 0.8–1.0 | 32.3 |
| 12 | 190 | 3.75 | 70 | PPVE (0.3) | (*1) | 1,300 | 130 | 91/9 | 0.9–1.0 | 32.0 |
| 13 | 30 | 3.75 | 85 | PPVE (0.3) | (*8) | 1,300 | 130 | 91/9 | 1.1–1.3 | 31.9 |
| 14 | 0 | 10 | 70 | PPVE (0.3) | (*1) | 1,300 | 130 | 91/9 | 0.8–1.0 | 32.2 |

Note:
(*1) A mixed monomer of TFE and 1.5% by mole of CTFE.
(*2) Charged in two portions of 2.5 g and 0.4 g.
(*3) A mixed monomer of TFE and 0.82% by mole of CTFE.
(*4) A mixed monomer of TFE and 0.35% by mole of CTFE.
(*5) Charged in one portion of 1.9 g.
(*6) Charged in two portions of 3.5 g and 2.5 g.
(*7) A mixed monomer of TFE and 2.7% by mole of CTFE.
(*8) A mixed monomer of TFE and 2.0% by mole of CTFE.
(*9) These values represent the amount of TFE consumed after charge of CTFE.

TABLE 3

| Example No. | Average particle size (μm) | Content of FAVE in polymer (wt %) | Content of CTFE (wt %) | SSG | TII | HRR extrusion RR:1,500 Pressure (kg/cm²) | Appearance | RR:2,000 Pressure (kg/cm²) | Appearance |
|---|---|---|---|---|---|---|---|---|---|
| 1 | 0.20 | 0.02 | 0.090 | 2.176 | 5 | 640 | A | 770 | B |
| 2 | 0.20 | 0.02 | 0.098 | 2.181 | 7 | 600 | B | 760 | B |
| 3 | 0.21 | 0.02 | 0.123 | 2.184 | 7 | 600 | B | 760 | B |
| 4 | 0.19 | 0.02 | 0.050 | 2.177 | 4 | 790 | B | 950 | C |
| 5 | 0.20 | 0.02 | 0.134 | 2.186 | 12 | 710 | B | 880 | B |
| 6 | 0.19 | 0.02 | 0.162 | 2.184 | 16 | 850 | B | 990 | C |
| 7 | 0.20 | 0.02 | 0.060 | 2.185 | 6 | 800 | B | 990 | B |
| 8 | 0.19 | 0.03 | 0.241 | 2.180 | 25 | 520 | A | 650 | B |
| 9 | 0.19 | 0.03 | 0.200 | 2.178 | 19 | 540 | A | 650 | B |
| 10 | 0.19 | 0.05 | 0.094 | 2.178 | 5 | 660 | A | 880 | B |
| 11 | 0.22 | 0.01 | 0.096 | 2.180 | 10 | 650 | B | 790 | C |
| 12 | 0.23 | 0.02 | 0.098 | 2.190 | 12 | 610 | A | 720 | B |
| 13 | 0.22 | 0.02 | 0.148 | 2.177 | 12 | 640 | B | 780 | B |
| 14 | 0.18 | 0.02 | 0.110 | 2.176 | 8 | 920 | B | 1,100 | C |

COMPARATIVE EXAMPLES 1-6

In the same manner as in Example 1 but changing the reaction conditions as shown in Table 4, the reaction is carried out to prepare a modified PTFE fine powder.

The physical properties and extrudability of the obtained modified PTFE fine powder are shown in Table 5.

As understood from Table 5, in Comparative Example 1, the extrusion pressure increased and any continuous extrudate could not be produced at RR=2,000 and no equilibrium state in which the extrusion pressure is stabilized appeared in a time-extrusion pressure plot. This might be due to a too small content of CTFE.

Comparative Example 3 reproduced the process disclosed in Japanese Patent Publication No. 26242/1981. The obtained PTFE fine powder has large TII, although it has good moldability.

In Comparative Example 4, CTFE is not used. Namely, as the modifier, PPVE is charged before the addition of the initiators, and the reaction is carried out with injecting TFE alone till its consumption reached 1,430 g. Therefore, the particle has no core-shell structure. The obtained polymer is PTFE fine powder containing a slight amount of PPVE as the modifier, so that it has poor HRR extrudability, although it has small TII and good heat stability.

Comparative Example 5 reproduced the process disclosed in Japanese Patent Publication No. 38159/1975. The procedures are substantially the same as in Comparative Example 4 but using, as the initiator, APS alone and 1.6 g of PPVE. The obtained PTFE fine powder has poor HRR extrudability although it has small TII.

Comparative Example 6 is characterized in that hexafluoropropene (HFP) is used as the modifier. The obtained PTFE fine powder has large TII as in Comparative Example 3.

TABLE 4

| Comp. Example No. | DSP (ppm) | APS (ppm) | Reaction temp. (°C.) | Modifier for core (g) | | Modifier for shell | | | Core-shell ratio (wt/wt) | Polymer concentration after reaction (wt %) |
|---|---|---|---|---|---|---|---|---|---|---|
| | | | | | | Kind | Charge manner | TFE consumption till CTFE charge (g) | Consumption of mixed monomer (g) | | |
| 1 | 120 | 3.75 | 70 | PPVE | (0.3) | CTFE | (*1) | 1,000 | 430 | 70/30 | 31.9 |
| 2 | 120 | 3.75 | 70 | PPVE | (0.3) | CTFE | (*2) | 1,000 | 430 | 70/30 | 31.4 |
| 3 | 60 | 4.1 | 85 | CTFE | (0.4) | CTFE | (*3) | 1,300 | 130 | 91/9 | 32.0 |
| 4 | 120 | 3.75 | 70 | PPVE | (0.3) | — | — | — | — | — | 31.5 |
| 5 | — | 10 | 70 | PPVE | (1.6) | — | — | — | — | — | 31.8 |
| 6 | 60 | 4.1 | 85 | HFP | (0.4) | CTFE | (*4) | 1,300 | 130 | 91/9 | 32.3 |

Note:
(*1) A mixed monomer of TFE and 0.23% by mole of CTFE.
(*2) A mixed monomer of TFE and 1.4% by mole of CTFE.
(*3) A mixed monomer of TFE and 4.0% by mole of CTFE.
(*4) A mixed monomer of TFE and 2.0% by mole of CTFE.

TABLE 5

| Comp. Example No. | Average particle size (μm) | Content of modifiers (wt %) | | | SSG | TII | HRR extrusion | | | |
|---|---|---|---|---|---|---|---|---|---|---|
| | | CTFE | PPVE | HFP | | | RR:1,500 | | RR:2,000 | |
| | | | | | | | Pressure (kg/cm²) | Appearance | Pressure (kg/cm²) | Appearance |
| 1 | 0.20 | 0.035 | 0.02 | — | 2.185 | 10 | 1,000 | C | N.D. | D |
| 2 | 0.20 | 0.280 | 0.02 | — | 2.184 | 33 | 640 | A | 770 | B |
| 3 | 0.24 | 0.250 | — | — | 2.183 | 40 | 520 | A | 670 | B |
| 4 | 0.26 | — | 0.02 | — | 2.186 | 1 | 1,080 | C | N.D. | D |
| 5 | 0.18 | — | 0.10 | — | 2.173 | 1 | 1,180 | C | N.D. | D |
| 6 | 0.23 | 0.148 | — | 0.003 | 2.180 | 32 | 600 | B | 640 | C |

What is claimed is:

1. Modified polytetrafluoroethylene fine powder, which comprises primary particles having a core-shell structure and having an average particle size of 0.1 to 0.6 μm, wherein the core comprises a copolymer consisting essentially of tetrafluoroethylene and 0.01 to 0.15% by weight, based on the total weight of the particles, of at least one olefinically unsaturated compound selected from the group consisting of a fluoroalkyl vinyl ether of the formula:

$$X(CF_2)_nOCF=CF_2$$

wherein X is a hydrogen atom, a fluorine atom or a chlorine atom and n is an integer of 1, 2, 4, 5 or 6 and a fluoroalkyl vinyl ether of the formula:

$$C_3F_7(OCF_2CF_2CF_2)_m[OCF(CF_3)CF_2]_lOCF=CF_2$$

wherein m is an integer of 0 to 2 and l is an integer of 0 to 2 and the shell comprises a copolymer consisting essentially of tetrafluoroethylene and 0.04 to 0.25% by weight, based on the total weight of the particles, of chlorotrifluoroethylene.

2. The modified polytetrafluoroethylene fine powder according to claim 1, which has a thermal instability index of less than 30.

3. The modified polytetrafluoroethylene fine powder according to claim 1, wherein a weight ratio of the core part and the shell part is from 50:50 to 98:2.

4. The modified polytetrafluoroethylene fine powder according to claim 1, wherein the content of chlorotrifluoroethylene is from 0.06 to 0.20% by weight, the content of the fluoroalkyl vinyl ether is from 0.02 to 0.04 % by weight, and the weight ratio of the core part and the shell part is from 70:30 to 95:5.

5. The modified polytetrafluoroethylene fine powder according to claim 1, wherein the content of chlorotrifluoroethylene is from 0.06 to 0.15% by weight, and the TII is less than 20.

6. The modified polytetrafluoroethylene fine powder according to claim 1, wherein the fluoroalkyl vinyl ether is perfluoropropyl vinyl ether.

7. A process for preparing modified polytetrafluoroethylene fine powder comprising primary particles having a core-shell structure and having an average particle size of 0.1 to 0.6 μm wherein the core comprises a copolymer consisting essentially of tetrafluoroethylene and 0.01 to 0.15% by weight, based on the total weight of the particles, of at least one olefinically unsaturated compound selected from the group consisting of a fluoroalkyl vinyl ether of the formula:

$$X(CF_2)_nOCF=CF_2$$

wherein X is a hydrogen atom, a fluorine atom or a chlorine atoms and n is an integer of 1, 2, 4, 5 or 6 and a fluoroalkyl vinyl ether of the formula:

$$C_3F_7(OCF_2CF_2CF_2)_m[OCF(CF_3)CF_2]_lOCF=CF_2$$

wherein m is an integer of 0 to 2 and l is an integer of 0 to 2 and the shell comprises a copolymer consisting essentially of tetrafluoroethylene and 0.04 to 0.25% by weight, based on the total weight of the particles, of chlorotrifluoroethylene, which process comprises polymerizing tetrafluoroethylene in an aqueous medium in the presence of a fluorine-containing dispersant at a temperature of 10° to 90° C. under average pressure of 6 to 30 kg/cm$^2$ by charging at least one olefinically unsaturated compound selected from the above fluoroalkyl vinyl ethers in an initial reaction stage, after consumption of at least 50% of tetrafluoroethylene to be polymerised, and further polymerizing tetrafluoroethylene with charging chlorotrifluoroethylene, wherein said chlorotrifluoroethylene is present in gaseous phase in an amount of at least 0.01% by mole until the total amount of the tetrafluoroethylene to be polymerized is consumed.

8. The process according to claim 7, wherein a mixture of disuccinic acid peroxide and a persulfate in a weight ratio of 50:1 to 8:1 is used as a polymerization initiator, said disuccinic acid peroxide is used in an amount of 20 to 1,000 ppm based on the weight of the aqueous medium.

9. The process according to claim 7, wherein the charge of the chlorotrifluoroethylene is initiated after the consumption of at least 70% of the tetrafluoroethylene to be polymerized.

* * * * *